United States Patent [19]

Ficken

[11] 4,111,868

[45] Sep. 5, 1978

[54] FIBERED SYNTHETIC CLAY COMPOSITION FOR USE IN AESTHETIC ARTS

[76] Inventor: Kent L. Ficken, Munjor Rte., Hays, Kans. 67601

[21] Appl. No.: 787,946

[22] Filed: Apr. 15, 1977

[51] Int. Cl.$^2$ ................................................ C08L 3/02
[52] U.S. Cl. ............................ 260/17.4 ST; 260/42.13
[58] Field of Search ...................... 260/17.4 ST, 42.13

[56] References Cited

U.S. PATENT DOCUMENTS

| | | | |
|---|---|---|---|
| 3,043,790 | 7/1962 | Sanders | 260/42.13 |
| 3,257,338 | 6/1966 | Sefton | 260/17.4 R |
| 3,947,398 | 3/1976 | Williams | 260/42.13 |
| 4,003,866 | 1/1977 | Paturle | 260/42.13 |
| 4,014,840 | 3/1977 | Emig et al. | 260/42.13 |
| 4,033,781 | 7/1977 | Hauser et al. | 260/42.13 |

FOREIGN PATENT DOCUMENTS 239,946 7/1962 Australia ............................... 260/42.13
567,297 2/1945 United Kingdom ............... 260/17.4 R

OTHER PUBLICATIONS

Chem. Absts., 71 : 104,855z, Sekiya et al., "Lightweight Construction Material."

*Primary Examiner*—Edward M. Woodberry
*Attorney, Agent, or Firm*—John H. Widdowson; Edwin H. Crabtree

[57] ABSTRACT

A clay composition mixed with water for forming a cohesive and plastic like material. The clay composition is used as a construction material, for sculpturing, and in arts and crafts for making a variety of art objects.

6 Claims, No Drawings

FIBERED SYNTHETIC CLAY COMPOSITION FOR USE IN AESTHETIC ARTS

BACKGROUND OF THE INVENTION

This invention relates generally to a clay composition and more particularly but not by way of limitation, to a composition mixed with water for forming a cohesive and plastic like material for use in construction and for sculpturing art objects.

Heretofore there have been a great number of binding compositions, molding materials, finishing mortars, and plaster compositions using gypsum, paper fiber, fiberglass, wheat paste, granular aggregates, and other organic and inorganic materials.

None of the prior art molding materials and compositions provide the novel composition as described herein for providing a unique composition for use in the construction industry, arts and crafts and related applications.

SUMMARY OF THE INVENTION

The clay composition, by adding water, can be made in a variety of consistencies from a slurry which is suitable for painting on a horizontal or vertical surface, such as walls or ceilings, to a stiff clay-like material suitable for molding into independent forms such as sculptures or art objects.

The composition has excellent qualities of cohesion and plasticity. The composition also has excellent tensile and compression strength and can be easily filed, sanded, drilled, sawed and tooled. The material may be molded into thin (i.e. ¼ inch thick) dishes, bowls, or the like and when dry is more shock resistant than stoneware and can be easily mended with glue if broken or cracked.

The clay composition, depending on the particular formula, can be recycled by soaking in water and reworked into its former plastic state thereby eliminating waste.

The material, while not waterproof, can be rendered waterproof by applying waterproof agents to the outer surface such as acrylic emulsions or comparable inorganic binders. Also the composition is fireproof although the material may begin to decompose at high temperatures.

The composition also eliminates shrinkage when it is applied to a rigid structure so that the composition will not crack when dried.

The clay compositions include powdered gypsum or Portland cement and marble dust. Nylon fiber is added to the gypsum and marble dust for improving the plasticity and strength of the mixture. The nylon fiber is used rather than fiberglass fibers because it is safer and less irritating to the skin. Added to this mixture are wheat paste and latex to act as binders for improving the compressive and tensile strengths of the composition. Also, the wheat paste and latex add additional plasticity to the material and help the wet material stick or bond to an already dry surface.

DESCRIPTION OF THE PREFERRED EMBODIMENTS

The subject invention comprises a novel combination of nylon fiber, powdered gypsum, marble dust, wheat paste, and latex mixed together in various percentages of the total dry weight and mixed with water for forming a chemical clay composition. The wheat paste and latex act as binding or adhesive agents. The agents are soluble at room temperatures. The following formulas are disclosed to illustrate the various percentages of the ingredients and the synergistic effect produced therefrom. While four formulas are shown, it should be appreciated to those skilled in the art of mixing various types of clay compositions that additional formulas using the same components could be prepared which would fall within the scope of the subject invention.

Formula A includes:
 Nylon fiber—.1% to 1%
 Powdered gypsum—40% to 60%
 Marble dust—40% to 60%
 Wheat paste—1% to 2%
 Latex—2% to 3%

Formula A provides a material with a slow setting time (i.e. 12 to 24 hours), and becomes harder as the hydrolysis of the powdered gypsum proceeds. The greater the amount of the powdered gypsum and marble dust ratio, the quicker the hydrolysis will develope. The prescribed ratio of the latex to wheat paste provides a mixture with plasticity and allows the user of the material to apply it in the form of a wet paste for adherance onto vertical or horizontal surfaces or in the form of a clay. The clay consistancy is easily worked into coils or slabs, and will accurately reproduce a texture or pattern which is stamped on or rolled into it.

The material can be recycled by soaking and reworking the dry material with water. The recycling can be accomplished as long as the ratio of gypsum to marble dust is at or below 1 to 1 respectively. This mixture provides enough marble dust filler to prevent the material from chemically setting, as long as the wet material is allowed to dry before hydrolysis develops (i.e. 6 to 12 hours). The completed work can also be rendered waterproof by applying a coating of resin or epoxy or any other comparable waterproofing agent.

Formula B includes:
 Nylon fiber—.1% to 1%
 Powdered gypsum—80% to 90%
 Marble dust—10% to 20%
 Wheat paste—.1% to 1%
 Latex—2% to 6%

This formula provides a substance which will set more quickly than the mixture of Formula A. The reason why this mixture will set more quickly is the greater percentage of the powdered gypsum. Also, by using a lower percentage of wheat paste and latex, the dry product will be less soluble to the addition of water. The mixture will also have less adhesive and cohesive properties if the minimum amounts of wheat paste and latex are used. This formula is advantageous for using as a construction material in applying to walls, ceilings, sheet rock, particle boards or the like, or in forming independent sheets, panels or the like for decorative interior applications. By using the formula in a slurry, the mixture can be sprayed onto walls and ceilings thereby providing a quick setting and abrasive resistent surface.

Formula C includes:
 Nylon fiber—.1% to 1%
 Powdered gypsum 0% to 20%
 Marble dust—80% to 98%
 Wheat paste—0% to 2%
 Latex—2% to 6%

Formula C provides a desirable mixture with an extended working time. If no gypsum or wheat paste is used, a wet mixture will remain plastic indefinitely. The ideal amount of latex is 4% while the wheat paste is eliminated to reduce the chance of mold spore growth. With a minimum amount of wheat paste and latex used, a weaker mixture is derived. If the maximum amount of wheat paste and latex are used, the strength of the mixture is improved, but a stickier mixture unsuitable for arts and crafts is produced.

Formula D includes:
  Nylon fiber—.1% to 1%
  Portland Cement—15% to 60%
  Sand—0% to 65%
  Rock Aggregate—0% to 40%
  Marble dust—20% to 85%
  Wheat paste—0% to .5%
  Latex—.1% to 6%

In this formula, by using Portland Cement instead of gypsum, a waterproof material suitable for outdoor use is produced without the need of a protective coating. If no sand or rock aggregate is used, the dry material can be drilled into, cut, filed or carved into, though not as easily as the gypsum compositions. A stronger material, but not toolable, can be composed with the addition of sand and rock aggregate. The advantage of this material over regular cement is its superior tensil strength because of the nylon fiber content, and its ability to form a stiffer, more cohesive material suitable for retaining a stamped or rolled impression for decorative purposes.

In the instance of wanting to apply a thin layer, as in a stucco texture, a mixture of masonry sand - portland cement - marble dust - latex - and nylon fiber, within the prescribed formula can be mixed to form a material with greater strength and crack resistance than those mixtures presently used without the use of reinforcing synthetic fibers.

As in an artistic application of the plastic composition, containing no course sand or rock aggregate, but having 2% to 4% latex, and 0.5% fiber, coils, balls, or other textures can be applied which were previously impossible. It is also suitable for stamp or roller impressions as in commercial production of panels.

If extended working time is desired, the ratio of marble dust to gypsum is increased. The greater the percent of marble dust the longer the working time. If the wheat paste and latex are reduced or eliminated and an insoluble binder is used, such as polyvinyl acetate, co- polymers of vinyl acetate, acrylic or the like, with an increase in the amount of gypsum a material which is water insoluble is provided. This composition will provide a mortar of stiff clay which can be used outdoors for application on rigid structures.

The above compositions as described, may be made impervious to water by applying a waterproofing solution to the outer surface when the composition has completely dried. Any good masonry or wood sealer may be used. Also a waterproof resin or epoxy may be used. For indoor work a hot paraffin wax may be used to provide an economical waterproof finish.

All of the above described components excluding the acrylic and other emulsions may be mixed in dry form by hand or an electrically powered mixing apparatus. A dry pigment may be added to the dry composition to produce a unified desired color. The pigment may also be introduced after the dry composition has been mixed with water to produce a "marblized" effect. The "marblized" effect or color combination produced by artistically composing designs of various colors of the clay composition is useful to create color and design interest without the need of additional painting processes.

Changes may be made in the composition and mixture of the preferred formulas as disclosed herein without departing from the spirit or scope of the invention as defined in the following claims.

I claim:

1. A clay composition mixed in a dry form with water for forming a cohesive and plastic like material for use in construction, sculpturing, arts and crafts and the like, the composition comprising:
   powdered gypsum;
   marble dust;
   nylon fiber present in the amount of .1%–1% of the dry weight of the total composition;
   wheat paste present in the amount of 0%–2% of the dry weight of the total composition; and
   latex present in the amount of 2%–6% of the dry weight of the total composition.

2. The composition of claim 1 wherein said powdered gypsum is present in the amount of 10%–80% of the dry weight of the total composition and said marble dust is present in the amount of 10%–80% of the dry weight of the total composition.

3. The compositin of claim 1 wherein said powdered gypsum is present in the amount of 40%–60% of the dry weight of the total composition and said marble dust is present in the amount of 40%–60% of the dry weight of the total composition.

4. The composition of claim 1 wherein said powdered gypsum is present in the amount of 80%–90% of the dry weight of the total composition and said marble dust is present in the amount of 10%–20% of the dry weight of the total composition.

5. The composition of claim 1 wherein said powdered gypsum is present in the amount of 10%–20% of the dry weight of the total composition and said marble dust is present in the amount of 80%–90% of the dry weight of the total composition.

6. The composition of claim 1 further including a screened sand present in the amount of 10%–20% of the dry weight of the total composition.